United States Patent [19]

McGuffin

[11] 4,313,189
[45] Jan. 26, 1982

[54] STYLUS POSITION SENSOR FOR VIDEO DISC PLAYER APPARATUS

[75] Inventor: William G. McGuffin, Willingboro, N.J.

[73] Assignee: RCA Corporation, New York, N.Y.

[21] Appl. No.: 105,504

[22] Filed: Dec. 20, 1979

[51] Int. Cl.³ .................. G11B 17/30; G11B 7/00; G11B 9/00; H04N 5/76

[52] U.S. Cl. .................................... 369/220; 369/43; 369/126; 358/128.5

[58] Field of Search ............ 358/128.5; 179/100.4 D, 179/100.3 D; 360/75, 77, DIG. 1; 274/13, 23 A; 369/220

[56] References Cited

U.S. PATENT DOCUMENTS

| | | | |
|---|---|---|---|
| 2,915,315 | 12/1959 | Rabinow | 274/13 |
| 3,572,724 | 3/1971 | Rabinow | 274/13 |
| 3,963,861 | 6/1976 | Crooks | 360/DIG. 1 X |
| 4,157,576 | 6/1979 | Hack et al. | 360/77 |
| 4,163,994 | 8/1979 | Sakamoto et al. | 360/DIG. 1 X |
| 4,164,756 | 8/1979 | Toda et al. | 179/100.4 D X |
| 4,167,762 | 9/1979 | Hashizaki et al. | 360/77 |
| 4,183,059 | 1/1980 | Palmer | 360/DIG. 1 X |

FOREIGN PATENT DOCUMENTS

| | | | |
|---|---|---|---|
| 496596 | 3/1976 | U.S.S.R. | 274/23 A |
| 1361610 | 7/1974 | United Kingdom | 274/23 A |

Primary Examiner—Aristotelis M. Psitos
Attorney, Agent, or Firm—E. M. Whitacre; J. S. Tripoli; E. P. Herrmann

[57] ABSTRACT

In certain video disc systems it is desirable to have a stylus position sensing apparatus. An electrode secured in fixed relation to a movable stylus is disposed between first and second electrodes to form first and second variable capacitors therewith. The capacitance of the variable capacitors change relative to the motion of the stylus related electrode between the first and second electrodes. Complementary signals are applied to the first and second electrodes, which signals are coupled proportional to the respective variable capacitances to the stylus related electrode. The algebraic sum of the signals coupled to the stylus related electrode is indicative of the position of the stylus.

4 Claims, 5 Drawing Figures

STYLUS POSITION SENSOR FOR VIDEO DISC PLAYER APPARATUS

This invention relates to video disc signal pickup apparatus and in particular to apparatus for determining the relative position of a signal pickup stylus with respect to the carriage assembly which translates the pickup stylus radially across the disc record.

Certain types of video disc systems utilize disc records wherein information is prerecorded by means of geometric variations in tracks or grooves proximate the surface of the disc. The information is reproduced by means of a signal pickup stylus which engages the track or groove and detects the geometric variations representative of the prerecorded signal. In the capacitance type systems the stylus-record interaction operates to form a time varying capacitance as the geometric variations in a particular track are moved past the stylus by the rotation of the disc, which time varying capacitance forms part of a tuned circuit to amplitude modulate a carrier frequency. The amplitude modulation is thereafter detected and converted to video and audio signals suitable for reproduction on standard receivers. In the pressure sensitive systems, geometric variations in the groove apply a time varying force to the stylus which is mechanically coupled to a pressure sensitive transducer for conversion to electrical signals.

Video disc systems of this type typically employ disc records having track or groove densities of 6,000 to 10,000 per inch. As a result of such high groove densities, it is difficult to reliably translate the stylus radially across the disc in accordance with normal play. Therefore the signal pickup stylus is mounted in a carriage assembly driven by motive means for translating the stylus radially across the disc generally synchronously with the rotation of the disc. Because the tracks tend to be slightly eccentric the stylus is mounted within the carriage for limited radial movement of the stylus with respect to the carriage. Such relative movement mechanically biases the stylus mounting arm from its home position and may undesirably affect a stylus deflection transducer which provides for stop motion and other special effects. In order to compensate for this condition, the relative stylus position with respect to the carriage assembly is monitored, and the carriage translation is controlled to maintain the stylus mounting arm in a generally unbiased condition and the stylus centered over the track.

One such stylus position monitoring system is disclosed in U.S. patent application Ser. No. 055,976 filed July 9, 1979 entitled, "Stylus Position Sensing Apparatus for Video Disc Player" assigned to the assignee of the present invention. That particular invention senses the stylus position by (a) establishing a capacitance between a first electrode fixed to the carriage and a second electrode in fixed relation to the stylus, (b) measuring the change in capacitance caused by changes in the relative proximity of the first and second electrodes to each other by (c) detecting the relative amplitude of an oscillatory signal coupled from the first to the second electrode, and (d) generating a control signal proportional to such coupled signal. The performance of this system may be affected, however, from changes in the parasitic electronic parameters present between the stylus-stylus arm-record system as well as variations in active-gain elements of the system. Changes in the parasitic parameters tend to affect the amplitude of the oscillatory signal coupled from the first to the second electrodes and consequently cause errors in the control system, especially when the coupled signal is measured against a fixed reference.

The present invention is directed toward a balanced sensing system wherein two signals from two electrodes disposed on either side of a third electrode in fixed relation to the stylus couple complementary signals to the third electrode. The two signals couple to the third electrode proportional to the varying capacitance formed between the electrodes and are arranged to sum to zero when the third electrode, and consequently the stylus, are in the desired position. Translation of the third electrode from the desired position creates a change in the summed signals, the amplitude and phase being respectively indicative of the extent and direction of such motion.

Figure 1:
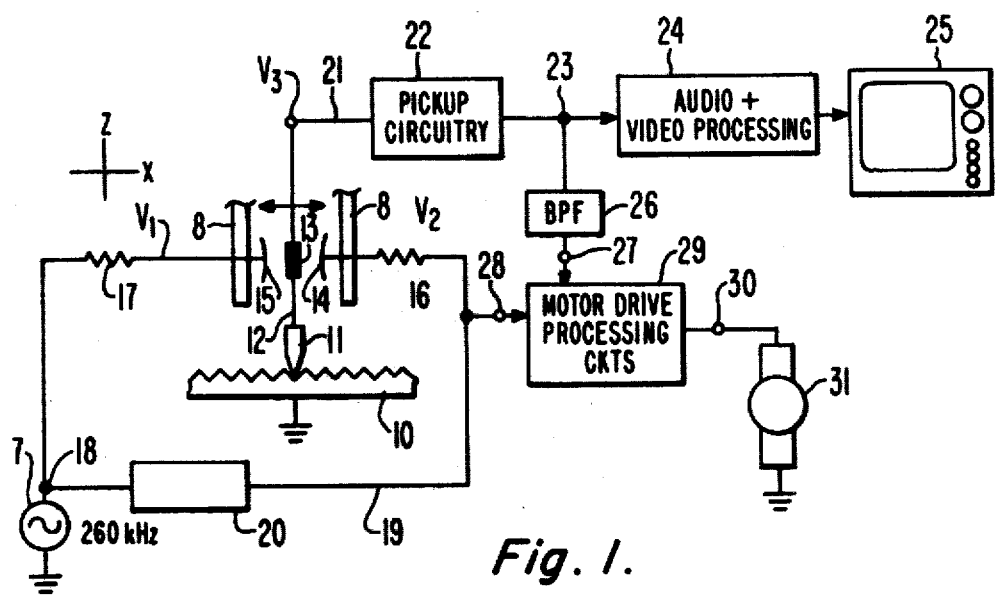
FIG. 1 is a partial schematic and partial block diagram of a balanced stylus position sensing system.

In FIG. 1 a signal pickup stylus 11 engages a record disc 10 for reproducing signals that have been prerecorded in tracks located on the surface of the disc. The signals on the disc are coupled via the stylus and connecting leads 12 and 21 to the pickup circuitry 22 to produce a frequency modulated or FM signal. The FM signal is subsequently processed by circuitry 24 to condition it for playback on the TV receiver 25. The stylus 11 is secured to a stylus arm (not shown) which is compliantly mounted to a carriage assembly for translating the stylus radially across the record disc, i.e., the direction designated "x" in the drawing. The mounting of the stylus arm to the carriage assembly may be directly to the carriage assembly or to a removably mounted cartridge within the carriage assembly. The elements 8 represent support members fixed to the cartridge or carriage assembly and disposed on either side of the stylus/stylus arm assembly. Secured to the support members in relatively close proximity to the stylus are first 14 and second 15 conducting electrodes. A third electrode 13 is secured to the stylus/stylus arm assembly located between the first and second electrodes 14 and 15. The third electrode 13 is constrained to move in accordance with at least the "x" directed stylus motion. Electrode 13 may be a separate conductive element secured to the stylus arm and electrically connected to the flylead 12 for electrically connecting the stylus to the pickup circuitry or electrode 13 may be a portion of the flylead per se which portion generally moves in conformance with the stylus.

First electrode 14 and third electrode 13 constitute the plates of a first variable air dielectric capacitor and second electrode 15 and third electrode 13 constitute the plates of a second variable air dielectric capacitor, the capacitance of the first and second variable capacitors changing in a quasi-complementary manner as the third electrode undergoes "x" directed motion relative to the support elements 8 fixed to the carriage assembly.

The first (second) capacitor increases in capacitance as the second (first) capacitor decreases in capacitance according to the relation $C = \gamma A/(d \pm x)$ where $\gamma$ is the permitivity of air, A is the area of the electrode 13 parallel to and adjacent respective electrodes 14 and 15, d is one-half the distance between electrodes 14 and 15 and x is the distance electrode 13 is displaced from the center position. For electrode 13 centered between electrodes 14 and 15, "x" is equal to zero and the first and second capacitors have equal capacitance values.

A signal source 7 provides a time varying signal of a generally oscillatory nature, which signal may be a regular waveform such as a sinusoid or square wave, for example, or an arbitrary waveform. For descriptive purposes herein, source 7 will be presumed to produce a sinusoidally varying signal. The source 7 applies a first signal, V1, to electrode 15 via impedance 17. The signal from source 7 is also operated on by circuit 20 to form a further signal V2 which is the complement of signal $V_1$ and signal $V_2$ is applied to electrode 14 via impedance 16. Here the complement of a signal is defined as a signal of instantaneous inverse polarity to the given signal with respect to a given reference. In the case of a regular oscillatory signal of constant frequency its complement is a similar signal but with a 180 degree phase difference. The amplitudes of the signal and its complement, for this application, need not be equal. Only in the case where the physical parameters of the balanced system are identical on both sides of the center electrode and it is desired to null the stylus exactly midway between the two fixed electrodes will the amplitudes of the signal and its complement be equal. If desired, the stylu/stylus arm location may be maintained in a position offset from center, by imposing an amplitude fifference between the signals and its complement.

The signals $V_1$ and $V_2$ applied to electrodes 14 and 15 are algebraically summed at electrode 13 by the coupling of the first and second capacitors. On the condition that the amplitude of signal V1 is equal to the amplitude of signal V2, the sum V3 of such signals equals zero for electrode 13 disposed equidistant from electrodes 14 and 15. As electrode 13 deviates from the center position and approaches either electrode 14 or 15, potential V3 increases in amplitude and assumes the phase angle of the signal of the nearer electrode. The amplitude and phase of potential V3 are indicative of the extent and the direction stylus 11 has moved relative to the fixed elements 8 (see FIG. 2).

Figure 2:
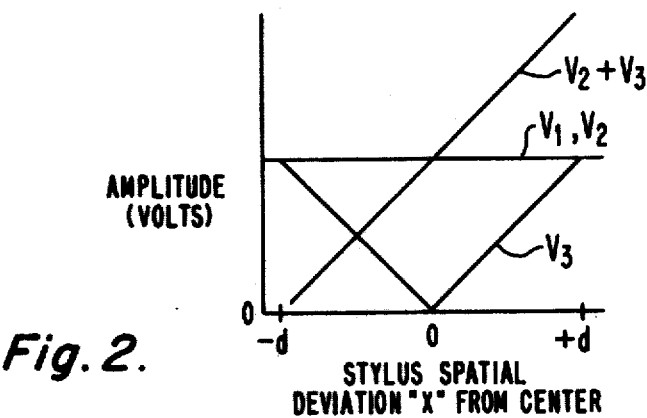
FIG. 2 is a graph of signal amplitude versus distance of stylus movement for various circuit nodes in the FIG. 1 system.

In FIG. 2 potentials V1 and V2 are of constant amplitude but anti-phase and are unaffected by the stylus position. The sum, $V_3$, of that portion of signals V1 and V2 coupled to electrode 13 is zero for a zero deviation from the center position, with its amplitude increasing for deviations of the stylus on either side of the center position. The phase of $V_3$ is presumed to be in phase with V1 to the left of center and to be in phase with V2 to the right of center. The sum of V2+V3 at the center position is therefore equal to V2 since V3 is zero, decreasing to the left of center because V2 and V3 are 180 degrees out of phase and increasing to the right of center because V2 and V3 are in phase. The curves V3 and V2+V3 are depicted as being linear in FIG. 2 which condition obtains where the pickup circuitry 22 is linear or voltage invariant. On the other hand, if circuit 22 is of the type having nonlinear input characteristics then the curves V3 and V2+V3 will exhibit nonlinearities as a consequence thereof, and means may be required to compensate for such nonlinearities.

The signal V3 after processing by the pickup circuitry 22 is actually a composite signal comprising the FM signal, representative of the signal prerecorded on the disc, combined with the sum of signals V1 and V2. This composite signal at terminal 23 is applied to the bandpass filter 26. Bandpass filter 26 is designed to pass to its output terminal 27, substantially only frequency components attributable to signals V1 and V2. The signal at terminal 27 is applied to processing circuit 29 where it is detected and buffered to modulate the potential applied to the carriage drive motor 31.

Figure 3:
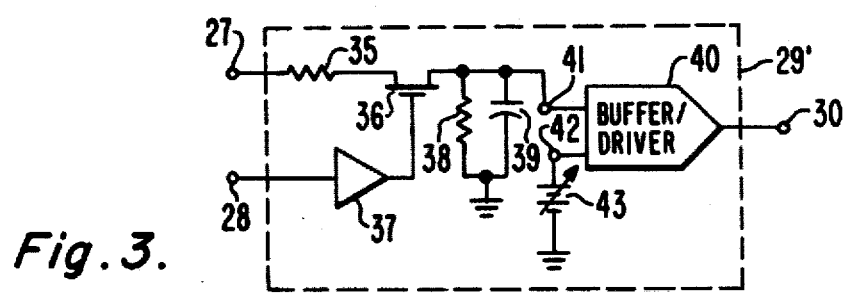
FIG. 3 is a partial schematic, partial block diagram of a synchronous detector-driver circuit.

FIG. 3 represents a particular circuit 29' to realize the function of the motor drive processing circuitry 29. This circuitry consists of a synchronous detector and a buffer/driver 40. Buffer/driver 40 responsive to a DC potential applied to its input terminal 42 by source 43 generates a nominal signal at its output 30 for energizing the motor 31 to drive the carriage radially across the disc record substantially synchronously with the disc rotation. The signal at the output 30 of buffer/driver 40 is subject to being increased or decreased in accordance with a correction signal applied to a second input terminal 41. The synchronous detector comprises a transistor switch 36 which is opened and closed in phase with one of the signals applied to electrodes 14 or 15. This signal is applied to terminal 28 and is conditioned by amplifier 37 to energize the control electrode of the transistor for rapid transitions between conduction and non-conduction. The summed signal V3 is applied to terminal 27 from which it is selectively applied by the transistor switch 36 to the capacitor 39-resistor 38 combination. For switch 36 closed capacitor 39 charges in potential commensurate with the potential appearing at terminal 27. For switch 36 open the capacitor partially discharges through resistor 38. The resultant potential on the capacitor 39, which is applied to terminal 41, tends toward the average value of the half rectified signal V3. The resultant potential is positive if the signals applied to terminals 27 and 28 are in phase and negative if they are out of phase. Thus the synchronous detector is capable of delivering bidirectional signals for controlling the buffer/driver 40. Alternatively capacitor 39 and resistor 38 may be returned to a prescribed reference potential other than ground reference in which case the potential at terminal 41 will be varied about the prescribed reference for controlling buffer 40.

Figure 4:
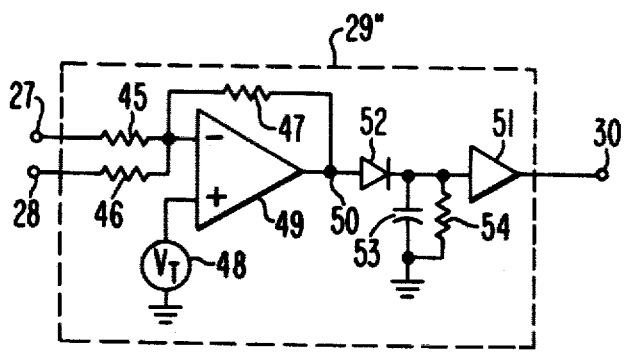
FIG. 4 is a block diagram of a summing and averaging circuit for processing the sensor signal.

FIG. 4 is a schematic of an alternate detection circuit 29". In this circuit amplifier 49 sums the signals applied to terminals 27 and 28 generating an AC output potential at terminal 50 expressed by $V50 = V27 \cdot R47/R45 + V28 \cdot R47/R46$ where V50, V27 and V28 are respectively the amplitudes of the signals at terminals 50, 27 and 28 and R45, R46 and R47 are the respective resistance values of resistors 45, 46 and 47. If the signal V3 applied to terminal 27 is zero, corresponding to the stylus being in its centered position, the potential at the amplifier 49 output terminal 50 is proportional to the signal V1 or V2 applied to terminal 28 and is presumed of substantially constant nominal amplitude. This signal is detected by the diode detector comprising diode 52, capacitor 53 and resistor 54 and then buffered by circuit 51 before being made available at output terminal 30. As the stylus is displaced from the center position the amplitude of the AC signal at terminal 50 is modulated by the signal applied to the terminal 27. If the signals at terminals 27 and 28 are in phase the amplitude of the signal at output terminal 50 increases above the nominal value and decreases when they are out of phase. The DC output potential at terminal 30 increases and decreases in conformance with the increase or decrease in amplitude of the AC signal at terminal 50 typified by the curve V2+V3 in FIG. 2. A DC potential applied to the non-inverting input terminal of amplifier 49 by potential source 48 permits adjustment of the nominal DC potential appearing at output terminal 30.

Figure 5:
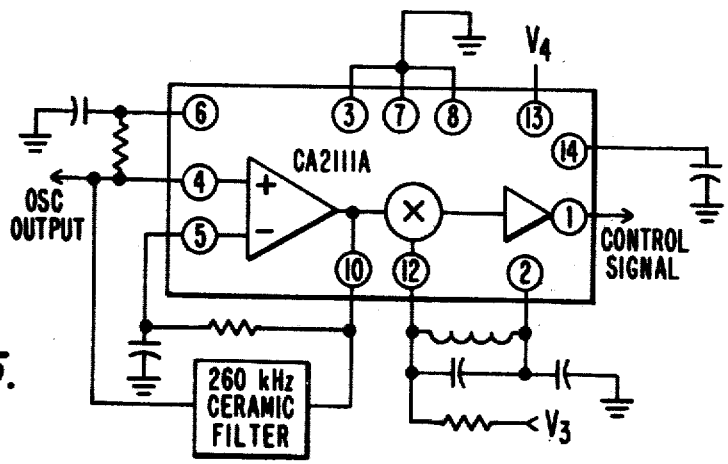
FIG. 5 is a block diagram of a preferred circuit for generating the oscillatory signal and detecting the sensor signal.

FIG. 5 illustrates the manner in which both the oscillator 7 and the processing circuits may be realized utilizing a commercially available integrated circuit such as the Motorola MC1357 or RCA Corp. CA2111A FM limiter and balanced product detector. The numbering in the figure conforms to the numbers of the package connection pins for the standard 14 pin dual in-line plastic package. The product detector is arranged to operate as a synchronous detector wherein the requisite reference signal is applied to terminal 10 and the signal to be detected, e.g., V3 is applied to terminal 12. The integrated circuit contains a high gain limiter amplifier which is connected with a 260 KHz ceramic filter to form a 260 KHz oscillator. The output of the oscillator supplies the reference signal to the synchronous detector at terminal 10. A second phase signal at terminal 4 is utilized as the source of oscillatory signal for driving electrodes 14 and 15 in FIG. 1, i.e., the source of signal applied to connection 18. The potential V4 applied to terminal 13 is a bias supply.

The balanced sensor system described herein is applicable to both the capacitive pickup and pressure sensitive systems. The particular embodiments illustrated herein are exemplary only and the claims should not be construed as limited to these embodiments as armed with the foregoing, one skilled in the art of detection systems will readily conceive of variations without straying from the spirit of the invention.

What is claimed is:

1. A video disc stylus carriage relative position sensing apparatus for generating a signal related to the stylus position within a supportive carriage comprising:
   first and second electrodes fixedly secured to a stylus carrying carriage;
   a third electrode having a fixed relation to said stylus and disposed between said first and second electrodes, said first and third and said second and third electrodes forming respectively first and second capacitors which vary in capacitance in accordance with the relative position of the stylus with respect to the carriage and wherein said stylus is mounted to permit relative movement between said stylus and the carriage;
   means for applying first and second phase related time varying signals to the first and second electrodes respectively, said first and second time varying signals being respectively coupled to the third electrode through the capacitance of the first and second capacitors respectively thereby providing a third signal at said third electrode, the phase and amplitude of said third signal being related to the relative position of the third electrode and thereby the stylus with respect to the first and second electrodes; and
   detection means responsive to said third signal for generating a substantially d.c. signal proportional to the position of the stylus relative to the carriage.

2. The stylus position sensing apparatus as set forth in claim 1 wherein said first and second time varying signals are sinusoidal waveforms of like frequency and having a 180-degree phase difference.

3. The stylus position sensing apparatus as set forth in claim 1 wherein said detection means comprises a synchronous detector having a first signal input terminal arranged for receiving said third signal, having a second signal input terminal arranged for receiving one of said first and second time varying signals, and having an output terminal, said detector providing at said output terminal a d.c. signal which varies about a reference potential in accordance with the stylus varying about a null position.

4. The stylus position sensing apparatus as set forth in claim 1 wherein the detection means comprises a summing circuit for adding the third signal to one of said first and second time varying signals, and, means for generating a further signal which is the average value of the summed signals, said further signal corresponding to said correction signal.

* * * * *